United States Patent [19]

Kashani et al.

[11] Patent Number: 5,361,530
[45] Date of Patent: Nov. 8, 1994

[54] REMOTELY CONTROLLED FISHING LINE CARRIER

[75] Inventors: David M. Kashani; Samson M. Kashani, both of 8670 Wilshire Blvd., #100, Beverly Hills, Calif. 90211

[73] Assignees: David M. Kashani; Samson M. Kashani, Beverly Hills, Calif.

[21] Appl. No.: 132,560

[22] Filed: Oct. 6, 1993

Related U.S. Application Data

[63] Continuation-in-part of Ser. No. 843,165, May 13, 1992, abandoned.

[51] Int. Cl.⁵ .................................. A01K 97/00
[52] U.S. Cl. ............................................. 43/26.1
[58] Field of Search .............. 43/26.1, 44.84, 6.5, 43/5

[56] References Cited

U.S. PATENT DOCUMENTS

| | | | |
|---|---|---|---|
| 3,106,796 | 10/1963 | Friedland | 43/26.1 |
| 3,435,552 | 4/1969 | Caldwell | 43/44.84 |
| 3,533,184 | 10/1970 | Kerr | 43/44.84 |
| 3,654,723 | 4/1972 | Mercer | 43/26.1 |
| 5,154,016 | 10/1992 | Fedora et al. | 43/26.1 |
| 5,201,884 | 4/1993 | Nicholas | 43/26.1 |

Primary Examiner—P. Austin Bradley
Assistant Examiner—Chuck Y. Mah
Attorney, Agent, or Firm—D'Alessandro, Frazzini & Ritchie

[57] ABSTRACT

The present invention relates to a fishing system in which one end of a fishing line is attached to a remotely controlled miniature boat powered by two propellers and controllable from a control point. The boat is connected to the control point by a fishing line as well as by a control link. At the rear end of the boat a rigidly mounted tail extends from the boat to provide a point for the attachment of the fishing line at or near the water's surface and clear of the propellers. A plurality of separate lines having hooks may be attached to the fishing line with hangers. A plurality of horizontally dispersed hooks may thus be set to catch fish over a wide area.

6 Claims, 4 Drawing Sheets

REMOTELY CONTROLLED FISHING LINE CARRIER

CROSS-REFERENCES TO RELATED APPLICATIONS

This application is a continuation-in-part of patent application Ser. No. 07/843,165 filed May 13, 1992, now, abandoned, which is hereby incorporated herein by reference.

BACKGROUND OF THE INVENTION

1. Field of the Invention

The present invention relates generally to the field of remotely controlled fishing devices. More particularly, it relates to remotely controlled fishing devices for controlling a plurality of horizontally dispersed fishing lines with hooks.

2. The Prior Art

A number of remotely controlled fishing devices are known in the prior art. For example, Sheng-Jung, U.S. Pat. No. 4,339,888 teaches an automatic line retrieval system for a single fishing line. The boat is controlled by a single propeller and a radio controlled rudder. The fishing line having the hook is deployed by a float assembly connected to the boat by a line. Retrieval of the system is accomplished by reeling in a line attached to the float assembly.

Ciaccio et al., U.S. Pat. No. 4,161,077 teaches the use of a boat with a single propeller, a remotely controlled rudder and a mast to which is removably attached a single fishing line. When the fish bites, the line releases from the mast and the boat must be recovered by means of its on-board motor and rudder under remote control from the shore.

Van Cleve, U.S. Pat. No. 4,757,633 also teaches a system having a single fishing line which releases from the boat when a fish strikes.

BRIEF DESCRIPTION OF THE INVENTION

The present invention relates to a fishing system in which one end of a fishing line is attached to a remotely controlled miniature boat powered by two propellers and controllable from a control point. The boat is connected to the control point by a fishing line as well as by a control link. At the rear end of the boat a rigidly mounted tail extends from the boat to provide a point for the attachment of the fishing line at or near the water's surface and clear of the propellers. A plurality of separate lines having hooks may be attached to the fishing line with hangers. A plurality of horizontally dispersed hooks may thus be set to catch fish over a wide area.

Accordingly, it is an object of the present invention to provide a remotely controlled fishing device capable of deploying a plurality of horizontally dispersed hooks.

It is a further object of the present invention to provide a remotely controlled fishing device capable of retrieval in the case of a power failure by manual retrieval of the fishing line.

A further object of the present invention is to provide a fishing device which, when pulled back to shore by the fishing line, is attached to the fishing line in such a way that its stability is maintained and the tendency toward capsize is minimized.

A further object of the present invention is to provide an attachment point for the fishing line that is clear of the propellers so as to minimize the risk of the fishing line fouling the propellers.

Yet a further object of the present invention is to provide a propulsion system having a pair of independently controllable propellers which are capable of providing directional control to the boat without the need for a rudder.

Further objects and advantages of the present invention will become apparent from a consideration of the drawings and ensuing description of the invention.

DESCRIPTION OF A PREFERRED EMBODIMENT

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
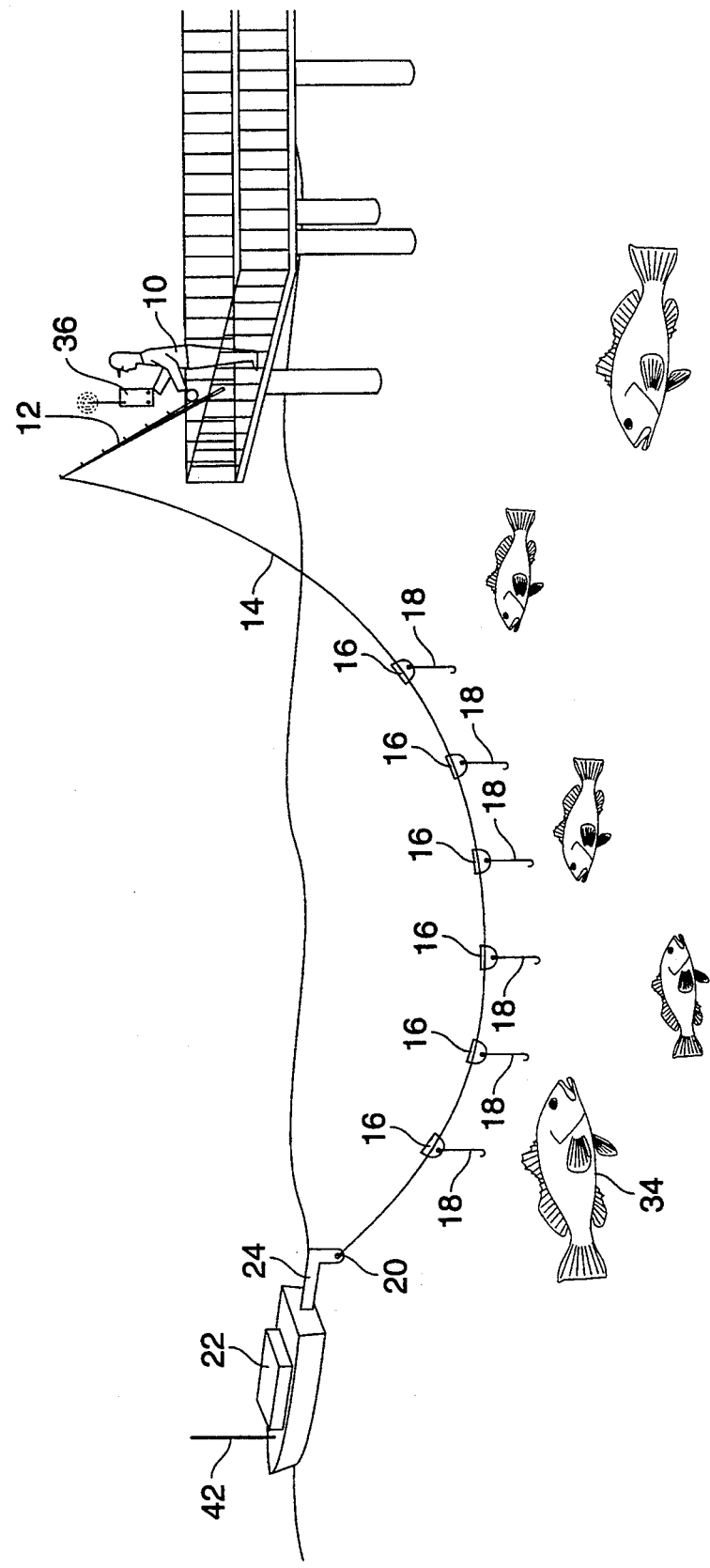
FIG. 1 is a drawing showing how the fishing device of the present invention is used.
Figure 2:
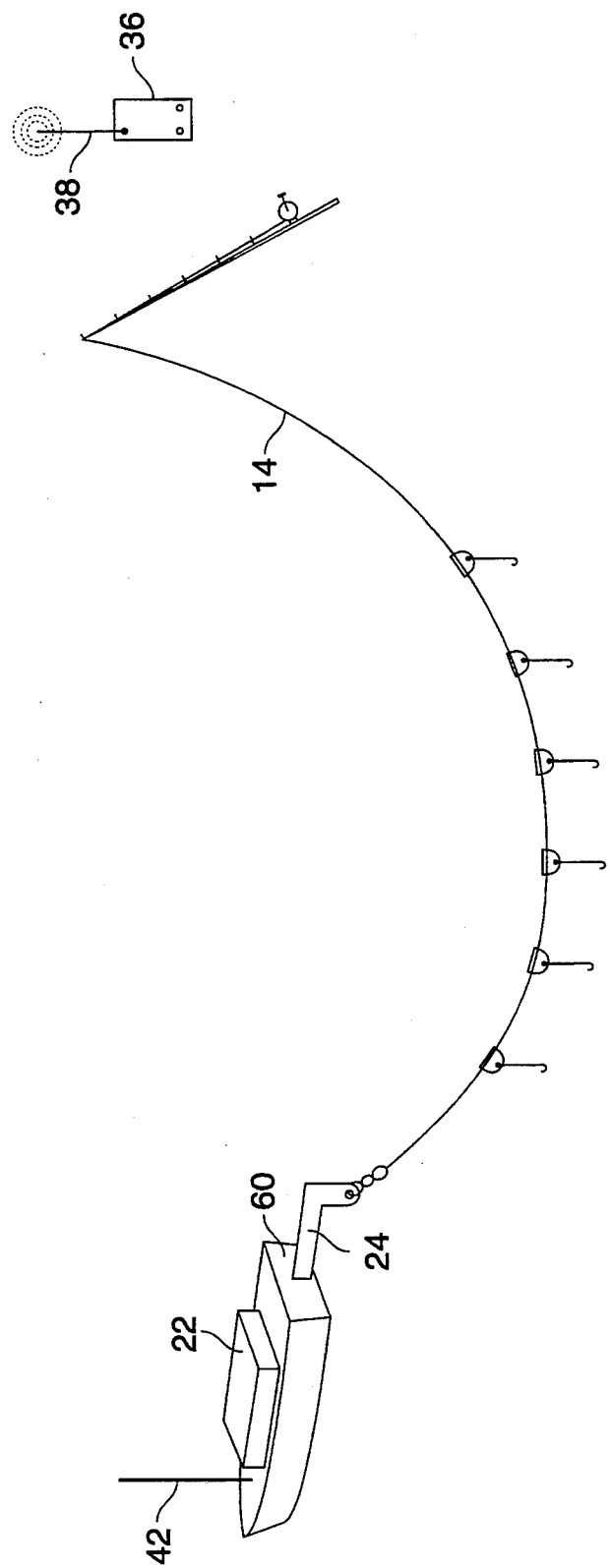
FIG. 2 is a schematic drawing of the fishing system.
Figure 3:
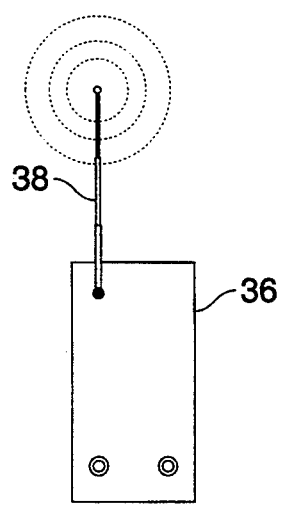
FIG. 3 is a block diagram of the control transmitter.
Figure 4:
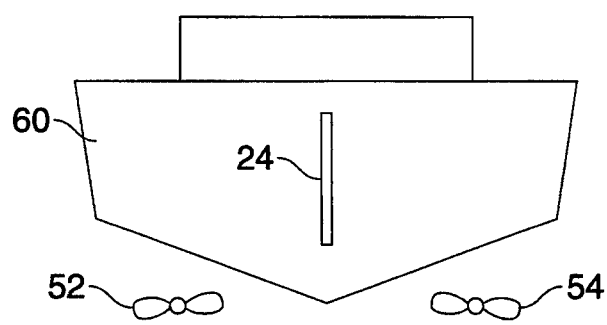
FIG. 4 is a view of the rear of the boat.
Figure 5:
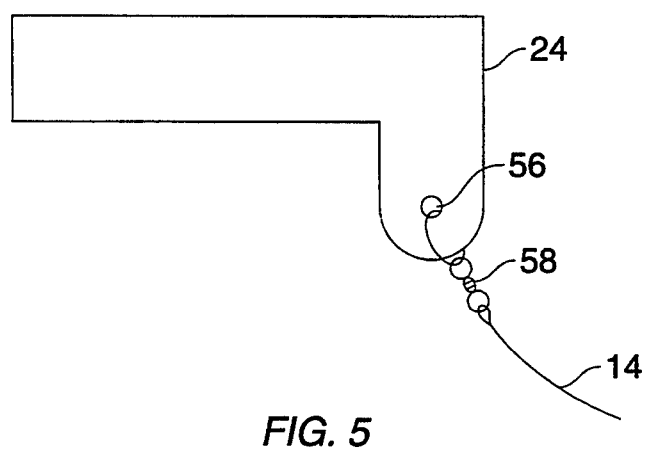
FIG. 5 is a drawing of the rigidly mounted tail.
Figure 6:
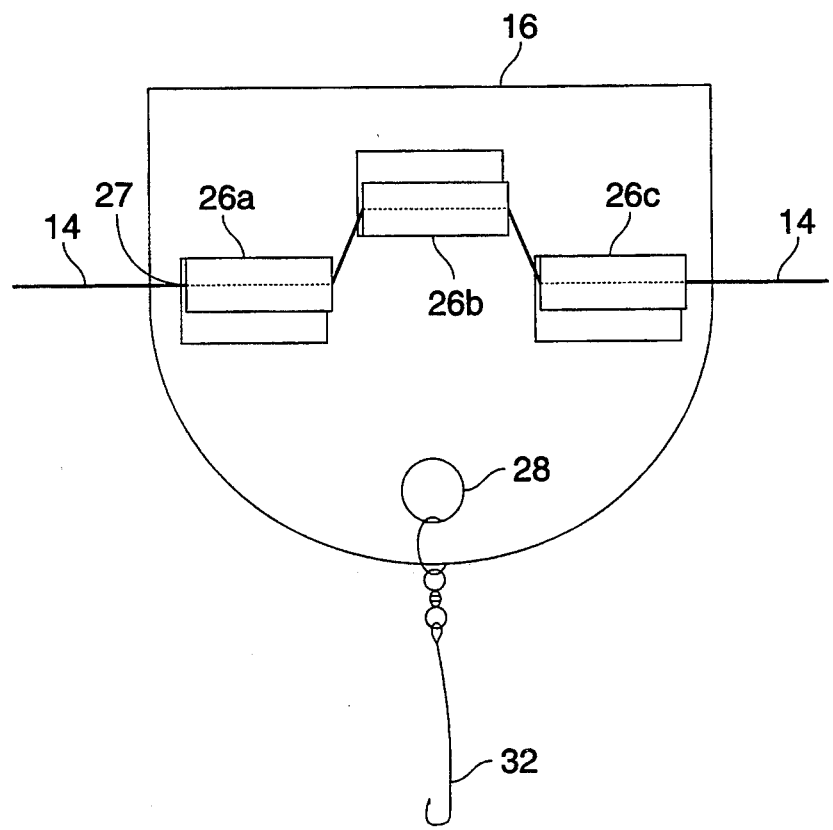
FIG. 6 is a drawing of the hook hanger.

Turning now to FIG. 1, fisherman 10 using a conventional fishing pole 12 extends a fishing line 14. Fishing line 14 preferably has a plurality of removably attached hangers 16 to which fishing hooks 18 are attached. The distal end 20 of fishing line 14 is attached to remotely controlled boat 22 (also referred to herein as a miniature floating vessel) at rigidly mounted tail 24. FIG. 6 depicts one of the hangars 16. Hanger 16 is preferably a plate including three flapped portions 26A, 26B and 26C as shown for receiving fishing line 14. As can be seen, flapped portions 26A and 26C comprise a flap extending in a first direction and flapped portion 26B comprises a flap portion extending in a direction opposite to that of the first direction. Flapped portions 26A, 26B and 26C form a "V" shaped slot 27 through which and against which the fishing line may travel. The flapped portions may be cut-outs from the plate leaving an orifice behind the flapped portions or may be flaps extending from the plate without a corresponding orifice. The flapped portions are arranged so that fishing line 14, when engaged with the three flapped portions, makes 4 right angles. By making these 4 right angles, friction between the fishing line 14 and the hanger 16 is increased to the point where the hangers do not easily slip along the fishing line 14. An attachment hole 28 is preferably provided for attaching a swivel 30, optionally additional line (not shown), optionally a sinker (not shown), and a hook 32. The hangers may preferably be fabricated of plastic or non-corroding metal. A plurality of hooked hangers 16 are preferably attached to fishing line 14 in order to provide improved horizontal coverage for increasing the likelihood of catching a fish 34.

The boat or vessel 22 is preferably a miniature radio controlled boat having a pair of independently controlled electrical motors and no rudder. Radio control systems for boats, airplanes, and the like are well known to those of skill in the art and commercially available from manufactures such as Sanwa, Futaba, and the like.

Figure 7:
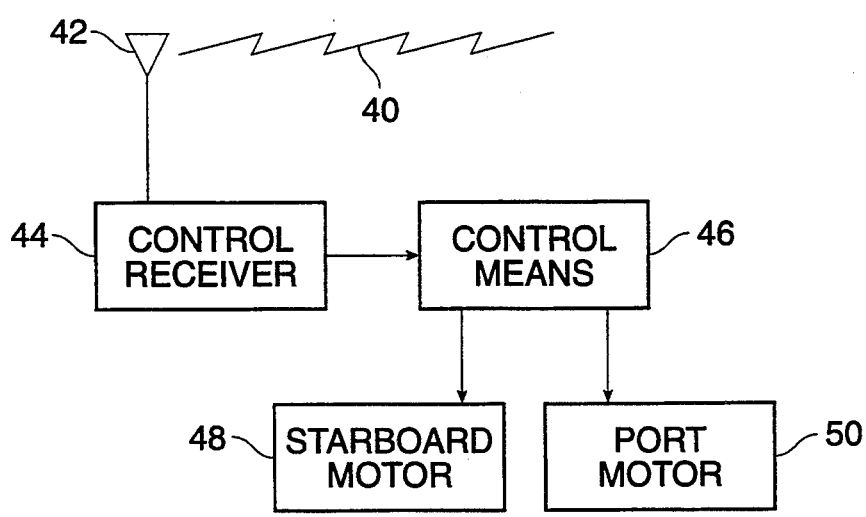
FIG. 7 is a block diagram of the motor control system.

Briefly, control unit 36 comprises a radio transmitter and an antenna 38 for generating control signals 40 on a predetermined frequency. Optionally, control unit 36 may be attached the fishing pole for added ease of use. As known to those of skill in the art, remote control systems other than radio control may be used. Turning to FIG. 7, control signals 40 are received by antenna 42 located on vessel 22. A control receiver 44 located on the vessel 22 receives and demodulates the control signals 40 and passes demodulated control signals to a control means 46 which provides power and speed (including directional: forward/backward) control information to the starboard motor 48 and the port motor 50. Independently controllable motors 48 and 50 permit the vessel to be controlled without a rudder because, for example, reversing the starboard motor and driving the port motor forward will cause the boat to turn to starboard, and vice versa. Port propeller 52 is driven by port motor 50. Starboard propeller 54 is driven by starboard motor 48.

Vessel 22 also includes a tail 24 which is rigidly mounted to the rear of the vessel and extends beyond the propellers 52, 54 in order to keep the fishing line 14 clear of the propellers and prevent fouling. Fishing line 14 is preferably semi-permanently attached to attachment point 56 with a swivel 58. During a fishing mission, line 14 should remain secured to vessel 22 so that should power fail or communications become disrupted, vessel 22 may be recovered by pulling in fishing line 14. When pulling the vessel back to shore (or wherever) in this manner, it is important that no significant moment be generated which would cause the vessel 22 to flip over or capsize. To minimize this tendency, the attachment point 56 is preferably located at the end of tail 24 as close as possible to the water surface on which vessel 22 floats and in the center of the rear 60 of vessel 22.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A remotely controlled fishing line carrier for carrying one end of a fishing line over the surface of water in response to control signals transmitted over a control channel comprising:

a miniature floating vessel having a rear portion including a port rear portion and a starboard rear portion, a first electrical motor and a second electrical motor, said first electrical motor connected to a first propeller protruding a first distance from said starboard rear portion, said second electrical motor connected to a second propeller protruding substantially said first distance from said port rear portion, directional control of said miniature floating vessel provided solely by said first electrical motor and said second electrical motor;

a tail extending from the rear of said vessel at a point between said first propeller and said second propeller and having an attachment point adapted to be fixedly attached to a fishing line at substantially the surface of the water, said tail rigidly mounted to the rear of said vessel and said attachment point located a second distance, greater than said first distance, from the rear of said vessel;

a control receiver located on said vessel for receiving control signals over a control channel;

control means on said vessel responsive to said control receiver for controlling the speeds of said first and second electrical motors.

2. A fishing system comprising:

a fishing pole having a fishing line associated therewith;

a control transmitter for transmitting control signals over a control channel;

a miniature floating vessel having a rear portion including a port rear portion and a starboard rear portion, a first electrical motor and a second electrical motor, said first electrical motor connected to a first propeller protruding a first distance from said starboard rear portion of the rear, said second electrical motor connected to a second propeller protruding substantially said first distance from said port rear portion, directional control of said miniature floating vessel provided solely by said first electrical motor and said second electrical motor;

a tail extending from the rear of said vessel at a point between said first propeller and said second propeller and having an attachment point adapted to be fixedly attached to a fishing line at substantially the surface of the water, said tail rigidly mounted to the rear of said vessel and said attachment point located a second distance, greater than said first distance, from the rear of said vessel;

a control receiver located on said vessel for receiving control signals over a control channel;

control means on said vessel responsive to said control receiver for controlling the speeds of said first and second electrical motors.

3. The fishing system of claim 2 further comprising:

a plurality of fishing hook hangers removably attached to said fishing line;

hooks, attached to each of said fishing hook hangers, adapted for catching fish.

4. The fishing system of claim 3 wherein said control transmitter is mounted on said fishing pole.

5. A fishing system comprising:

a fishing pole having a fishing line associated therewith;

a control transmitter for transmitting control signals over a control channel;

a miniature floating vessel having a rear portion including a port rear portion and a starboard rear portion, a first electrical motor and a second electrical motor, said first electrical motor connected to a first propeller protruding a first distance from said starboard rear portion, said second electrical motor connected to a second propeller protruding substantially said first distance from said port rear portion;

a tail extending from the rear of said vessel at a point between said first propeller and said second propeller and having an attachment point adapted to be fixedly attached to a fishing line at substantially the surface of the water, said tail rigidly mounted to the rear of said vessel and said attachment point located a second distance, greater than said first distance, from the rear of said vessel;

a control receiver located on said vessel for receiving control signals over a control channel;

control means on said vessel responsive to said control receiver for controlling the speeds of said first electrical motor and said second electrical motor;

a plurality of fishing hook hangers removably attached to said fishing line;

hooks, attached to a plurality of said fishing hook hangers, adapted for catching fish; said fishing hook hangers comprising a plate having at least three flapped portions protruding from said plate forming V-shaped slots adapted for receiving said fishing line and securing said fishing hook hangers to said fishing line.

6. The fishing system of claim 5 wherein said V-shaped slots of said fishing hook hangers are not all aligned in a straight line.

* * * * *